US012626568B2

(12) United States Patent
Kumar

(10) Patent No.: US 12,626,568 B2
(45) Date of Patent: May 12, 2026

(54) TIERED MOTION DETECTION FOR VIDEO SURVEILLANCE SYSTEMS

(71) Applicant: DRAGONFRUIT AI, INC., Menlo Park, CA (US)

(72) Inventor: Amit Kumar, Menlo Park, CA (US)

(73) Assignee: DRAGONFRUIT AI, INC., Menlo Park, CA (US)

( * ) Notice: Subject to any disclaimer, the term of this patent is extended or adjusted under 35 U.S.C. 154(b) by 0 days.

(21) Appl. No.: 18/595,805

(22) Filed: Mar. 5, 2024

(65) Prior Publication Data

US 2025/0285520 A1     Sep. 11, 2025

(51) Int. Cl.
| | |
|---|---|
| *H04N 5/00* | (2011.01) |
| *G06T 7/20* | (2017.01) |
| *G08B 13/196* | (2006.01) |
| *G08B 13/19* | (2006.01) |

(52) U.S. Cl.
CPC .......... G08B 13/19652 (2013.01); G06T 7/20 (2013.01); G08B 13/19608 (2013.01); G06T 2207/20104 (2013.01)

(58) Field of Classification Search
USPC ......................................................... 348/143
See application file for complete search history.

(56) References Cited

U.S. PATENT DOCUMENTS

| | | | | |
|---|---|---|---|---|
| 9,743,239 | B1 * | 8/2017 | Mishra ................... | H04W 4/023 |
| 10,803,667 | B1 * | 10/2020 | Madden ................. | G06V 20/52 |
| 11,164,006 | B2 * | 11/2021 | Oami ..................... | H04N 7/181 |
| 11,557,142 | B1 * | 1/2023 | Kerzner ................. | A01M 29/06 |
| 11,915,481 | B1 * | 2/2024 | Nager ..................... | G06F 40/56 |
| 12,047,712 | B2 * | 7/2024 | Iwai ................. | G08B 13/19602 |
| 12,159,256 | B1 * | 12/2024 | Zeng ..................... | G06T 19/006 |
| 2015/0302495 | A1 * | 10/2015 | Stuckman ............. | G01S 1/7038 705/26.35 |
| 2017/0323259 | A1 * | 11/2017 | Gillen ................... | H04W 12/08 |
| 2019/0311431 | A1 * | 10/2019 | Simpson ............... | G06F 16/248 |
| 2019/0318286 | A1 * | 10/2019 | Simpson .......... | G06Q 10/06315 |
| 2019/0325389 | A1 * | 10/2019 | Dearing ............. | G06Q 10/0833 |
| 2019/0338560 | A1 * | 11/2019 | Ali .......................... | E05B 45/06 |
| 2020/0117407 | A1 * | 4/2020 | Yoshimura ............. | G06F 3/121 |
| 2020/0327682 | A1 * | 10/2020 | Nater ................... | G06V 10/255 |
| 2020/0349511 | A1 * | 11/2020 | Seaver ............ | G06Q 10/06312 |
| 2021/0027560 | A1 * | 1/2021 | Gonzales, Jr. ..... | G06Q 10/0832 |
| 2021/0385417 | A1 * | 12/2021 | Park ..................... | G06F 3/0484 |
| 2021/0406825 | A1 * | 12/2021 | Lee ................. | G06Q 10/08355 |
| 2022/0027845 | A1 * | 1/2022 | Silverstein ......... | G06Q 10/0838 |
| 2022/0180282 | A1 * | 6/2022 | Powell ................. | G05D 1/0246 |

(Continued)

*Primary Examiner* — Nigar Chowdhury

(57) ABSTRACT

Systems, methods, and software to process tiered motion detection for video surveillance are provided herein. In one implementation, a video processing computing system is configured to identify a request for an object to enter a physical area and select a portion of the physical area available to the object based on the request. The video processing computing system is further configured to monitor movement of the object in the physical area using one or more video streams from one or more cameras and determine that the object moved outside the portion of the physical area available to the object based on the monitored movement. The computing system also generates an alert in response to the determination that the object moved outside the portion of the physical area available to the object.

20 Claims, 8 Drawing Sheets

(56) References Cited

U.S. PATENT DOCUMENTS

2024/0071191 A1*  2/2024  Mullins ............ G08B 13/19613
2024/0239365 A1*  7/2024  Banerjee ................. E05F 15/40
2024/0338026 A1*  10/2024  Shoeb .................. G05D 1/6445

* cited by examiner

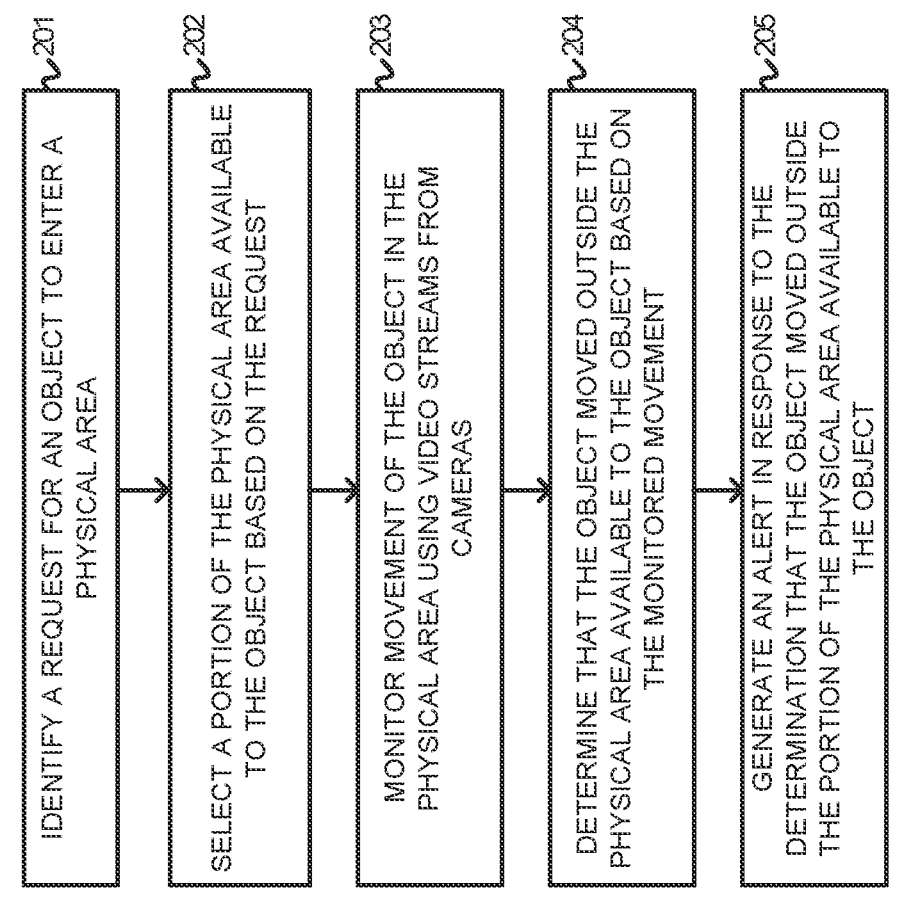

201 — IDENTIFY A REQUEST FOR AN OBJECT TO ENTER A PHYSICAL AREA

202 — SELECT A PORTION OF THE PHYSICAL AREA AVAILABLE TO THE OBJECT BASED ON THE REQUEST

203 — MONITOR MOVEMENT OF THE OBJECT IN THE PHYSICAL AREA USING VIDEO STREAMS FROM CAMERAS

204 — DETERMINE THAT THE OBJECT MOVED OUTSIDE THE PHYSICAL AREA AVAILABLE TO THE OBJECT BASED ON THE MONITORED MOVEMENT

205 — GENERATE AN ALERT IN RESPONSE TO THE DETERMINATION THAT THE OBJECT MOVED OUTSIDE THE PORTION OF THE PHYSICAL AREA AVAILABLE TO THE OBJECT

TIERED MOTION DETECTION FOR VIDEO SURVEILLANCE SYSTEMS

BACKGROUND

Video surveillance involves the use of cameras to monitor and record activities in a specific area. These cameras capture live footage, which can be viewed in real-time or stored for later analysis. Video surveillance is commonly employed for security purposes, such as monitoring public spaces, businesses, and homes to deter and detect criminal activities. Advances in technology have led to the integration of features like facial recognition and remote access to enhance the effectiveness of video surveillance systems.

In addition to video surveillance, many organizations and businesses employ motion detector to identify desirable (or undesirable) movement in a physical area. The basic principle behind motion detection is to monitor changes in the environment and trigger an alert or response when movement is detected. However, while motions sensors can be useful in monitoring a physical area, difficulties arise in managing the location and placement of the sensors. Further, difficulties arise in configuring different sensors for different situations and preferences.

OVERVIEW

Provided herein are systems, methods, and software to provide tiered motion detection for video surveillance systems. In one implementation, a method of operating a video processing computing device includes identifying a request for an object to enter a physical area and selecting a portion of the physical area available to the object based on the request. The method further includes monitoring movement of the object in the physical area using one or more video streams from one or more cameras and determining that the object moved outside the portion of the physical area available to the object. The method also provides generating an alert in response to the determination that the object moved outside the portion of the physical area available to the object.

In one implementation, the method further includes identifying a map of the physical area and obtaining user input identifying stationary objects in the one or more video streams and the map, wherein the user input for each stationary object of the stationary objects correlates a tag of said stationary object in at least one video stream of the one or more video streams to a representation of said object stationary object in the map. The method further provides obtaining second user input that defines the portion of the physical area available to the object relative to the stationary objects.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 2 illustrates an operation of a video processing computing device to provide tiered motion detection for video surveillance according to an implementation.

DETAILED DESCRIPTION

Figure 1:
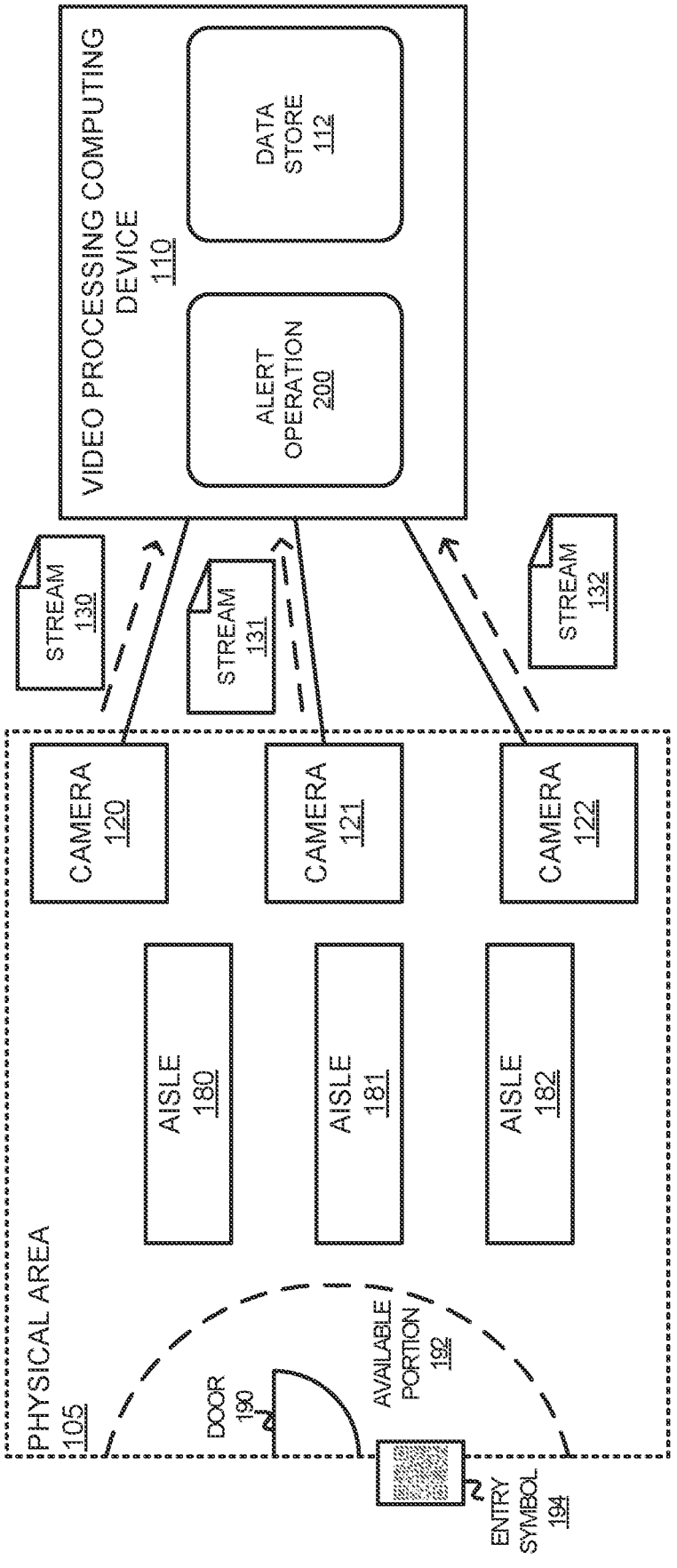
FIG. 1 illustrates a computing environment to provide tiered motion detection for video surveillance according to an implementation.

FIG. 1 illustrates a computing environment 100 to provide tiered motion detection for video surveillance according to an implementation. Computing environment 100 includes physical area 105, video processing computing device 110, and streams 130-132. Physical area 105 further includes cameras 120-122 that provide video streams 130-132, aisles 180-182, door 190, available portion 192, and entry symbol 194. Video processing computing device 110 includes data store 112 and provides alert operation 200 that is described below with respect to FIG. 2.

In computing environment 100, cameras 120-122 provide video streams 130-132 to video processing computing device 110. Cameras 120-122 are each representative of a surveillance camera that is a device equipped with a lens and sensor to capture video footage of a specific area or location. It is commonly used for security purposes to monitor activities and deter potential threats. Video processing computing device 110 is communicatively coupled to cameras 120-122 and is representative of one or more computers, such as desktop computers, server computers, and the like capable of processing video streams 130-132. Here, cameras 120-122 capture video for physical area 105, which is representative of a retail environment (although other surveillance environments are possible). As video streams 130-132 are received, video processing computing device 110 processes the data in the streams and identifies objects of interest in the video data, events of interest in the video data, or some other trend associated with the video data. The processed information can be stored in data store 112 or provided to a client device (e.g., computer, phone, and the like) associated with an administrator of physical area 105.

Here, an administrator of physical area 105 designates different regions within physical area 105 for different surveillance conditions. The different regions can correspond to an open condition for physical area 105 that does not generate an alert based on object movement (e.g., people movement), a closed condition for physical area 105 that generates an alert when movement is detected (e.g., a break in of physical area 105), and an intermediary condition that can be used for personnel leaving products, collecting products, or providing some other operation within a smaller region of physical area 105. For example, a retail store will require deliveries during closed business hours that should be delivered in available portion 192. Rather than permitting the delivery person to traverse the entirety of physical area 105, available portion 192 is used to limit the amount of physical area available for the delivery. Thus, when a delivery is required, rather than permitting the person to walk between aisles 180-182, the person is limited to the available portion 192 closest to door 190. When the person exceeds available portion 192, video processing computing device 110 generates an alert for the administrator of physical area 105 indicating the movement. The alert can include a timestamp, a video segment of the movement, an identifier of the person in physical area 105, or some other information associated with the event.

In some implementations, the administrator provides input using the video streams and/or a map of physical area 105 to indicate available portion 192. In one example, the administrator indicates via highlighting, shading, or some other mechanism, the available movement areas for a user in available portion 192. The highlighting can be performed on the video stream, such as video stream 130, that permits video processing computing device to infer the permitted location of an object (e.g., person, vehicle, and the like). In a retail environment, the administrator can indicate the floor or aisles using shading that are part of available portion 192 in video streams 130-132. While monitoring the movement of the objects, such as people, video processing computing device 110 will determine the location of the person relative to the shaded portions and determine when the person exceeds the limit defined by the shading.

In another example, the administrator provides a map of physical area 105 and provides input identifying stationary objects in the one or more video streams and the map, wherein the user input for each stationary object of the stationary objects correlates a tag of the stationary object in at least one video stream of the one or more video streams to a representation of the object stationary object in the map. For example, a user interface will display the overhead map and a video stream, and the user will tag an object, such as an aisle endcap, in both a video stream and the map. Advantageously, the tagging of the stationary objects (or landmarks), permits video processing computing device 110 to determine the orientation and location of the camera relative to the environment. Once the stationary objects are identified, the administrator provides second input that defines the portion of the physical area available to the moving object relative to the stationary object. The second user input can comprise shading or highlighting the available movement areas (e.g., floor) in the map or the video stream in relation to the stationary landmarks. This allows video processing computing device 110 to identify and monitor the movement associated with objects in physical area 105 more accurately using the known stationary objects defined in both the map and the video stream. Specifically, video processing computing device 110 will monitor the movement of objects relative to the provided landmark information and path information for physical area 105. When the object exceeds an approved region defined by the path in relation to landmark objects, an alert is generated indicating the deviation from the approved region.

In at least one embodiment, physical area 105 is associated with a tiered security configuration. A first configuration that secures all physical area 105 (e.g., closed condition), a second configuration that permits entry and movement throughout physical area 105 (e.g., open condition), and a third configuration that permits an entry to available portion 192. An administrator of physical area 105 will generate a request to place video processing computing device 110 into the first configuration that generates alerts based on movement in all physical area 105. When in the first condition, a delivery person approaches entry symbol 194 that identifies physical area 105 and initiates the workflow to enter physical area 105 via door 190. Entry symbol 194 can comprise a QR code, image, barcode, or some other symbol that identifies the physical area and initiates the operations to enter the physical area. The delivery person will use a personal device, such as a smartphone, to capture or take an image of entry symbol 194. Once captured, the delivery person provides further input, such as usernames, passwords, and the like as credentials to enter physical area 105. After the credentials are obtained for physical area 105 identified via entry symbol 194, the credentials are provided to video processing computing device 110 that determines whether the person is permitted, and which portion is available to the delivery person. If permitted, video processing computing device 110 moves to the third configuration that permits entry for the person to available portion 192. The person can enter for a defined period (e.g., five minutes), can enter until the person provides a notification that access is no longer required, or can terminate the entry permissions at some other condition. Once terminated, video processing computing device 110 returns to securing the entirety of physical area 105.

FIG. 2 illustrates an operation 200 of a video processing computing device to provide tiered motion detection for video surveillance according to an implementation. Operation 200 is referenced parenthetically in the paragraphs that follow with reference to systems and elements of computing environment 100 of FIG. 1.

Operation 200 includes identifying (201) a request for an object to enter a physical area. The physical area can comprise a commercial environment, a retail environment, a public space, or some other environment. The request is associated with a particular purpose, such as product delivery, product pickup, security check, or some other access request associated with portion of the physical area. For example, a delivery driver can generate a request to enter a retail environment to provide products, wherein the delivery will require a portion at the front or rear of the retail environment to deliver the required products but should not require movement to other portions of the physical area. For example, in physical area 105, a delivery driver would only require available portion 192 near door 190 to provide the required products. In generating the request, the object or delivery person can provide credentials, such as a user identifier, passcode, a QR code, or some other credential information to verify that they are able to access available portion 192. If not permitted, video processing computing device 110 will not make the area available to the object.

In response to receiving the request, video processing computing device 110 selects (202) a portion of the physical area available to the object based on the request. Thus, when the request corresponds to an approved delivery driver or other object with permissions for available portion 192, video processing computing device 110 will select available portion 192 for the object. In at least one example, video processing computing device 110 will provide alerts associated with object movement in the entire physical area 105 during a first period. Once the request is made by the object, video processing computing device 110 will provide alerts when the permissions associated with available portion 192 are exceeded. The permissions may include moving outside of available portion 192 and into another impermissible portion of physical area 105, having too many objects located in portion 192, or some other impermissible action in association with available portion 192. As an example, video processing computing device 110 can determine that two people enter available portion 192 when only a single person is permitted based on the request. In response to identifying the two people, video processing computing device 110 generates an alert that is provided to an administrator of physical area 105.

Although only a single available portion is indicated in physical area 105, a physical area can include multiple available portions that are selected based on the object making the request. For example, a first employee can be provided with a first available portion, while a second employee is provided with a second available portion. The portion is selected based on the credentials supplied in association with the request.

In some implementations, the available portion is defined based on administrator input associated with physical area 105. For example, the user can shade, highlight, or otherwise indicate across video streams 130-132 the available portions of physical area 105 for the object.

In another implementation, video processing computing device 110 defines the portions by identifying a map of the physical area that defines an overhead map of physical area 105. Once the map is identified, video processing computing device 110 obtains input from an administrator that identifies stationary objects in the one or more video streams and the map, wherein the user input for each stationary object of the stationary objects correlates a tag of said stationary object in at least one video stream of the one or more video streams to a representation of said object stationary object in the map. For example, in the retail environment of physical area 105, the administrator can indicate an endpoint of aisle 180 in video stream 130 and the map of the physical area. This permits video processing computing device 110 to define the orientation and location of camera 120 relative to physical area 120. Once the location is known in association with camera 120, the administrator further provides second input indicating available portion 192. The second input can be provided on the map or the video stream, and can be indicated using shading, highlighting, or otherwise identifying the available locations for the entering object (i.e., person). For example, the administrator can shade portions of the map that correspond to available portion 192 in the different streams of video streams 130-132. The portion defined by the administrator can then be used to support a request for an object to enter the desired portion of physical area 105.

Once a portion is selected based on the request, operation 200 further monitors (203) movement of the object in the physical area using one or more video streams from one or more one or more cameras. Video processing computing device 110 can identify the object entering available portion 192 via object recognition and monitor the movement of the object while in physical area 105. For example, video processing computing device 110 can identify a delivery person coming through door 190 and monitor the person using cameras 120-122. In monitoring the person in physical area 105, video processing computing device 110 determines the location of the person relative to the defined path information (i.e., shading, highlighting, etc.) available to the person and/or the landmarks defined by the administrator as part of the available region. Specifically, the landmarks are used to determine the location of the moving object in the map by identifying the location of person relative to the landmarks. Thus, if the object (i.e., person) is close to a landmark defined for a corner of an aisle 181, video processing computing device 110 determines that the object is near the landmark. The video processing computing device

110 then compares the determined location of the moving object relative to the landmarks to the approved region available to the moving object.

While monitoring the movement of the object, operation 200 further determines (204) that the object moved outside the portion of the physical area available to the object based on the monitored movement. Operation 200 then generates (205) an alert in response to the determination that the object moved outside the portion of the physical area available to the object. For example, a delivery person to physical area 105 will be monitored by cameras 120-122. When the delivery person exceeds the area available as part of available portion 192, video processing computing device 110 will generate a notification that is provided to an administrator (or authorities) for physical area 105. In some implementations, in addition to determining when the object leaves available portion 192, video processing device 110 will further determine when additional objects are in available portion 192. For example, when a request is generated to enter available portion 192, the permissions associated with the request will permit a single object to enter the available portion. When multiple objects are detected from video streams 130-132 in available portion 192, video processing computing device 110 will generate an alert.

Although described in the previous example using a retail environment with the move, similar operations can be performed in other environments with other movable objects, such as vehicles or robots. For example, a vehicle (or user in a vehicle) will generate a request to enter a physical area. In response to the request, the video processing computing device identifies a portion or region available for the vehicle and monitors the vehicle to determine whether the vehicle exceeds the available region.

Figure 3:
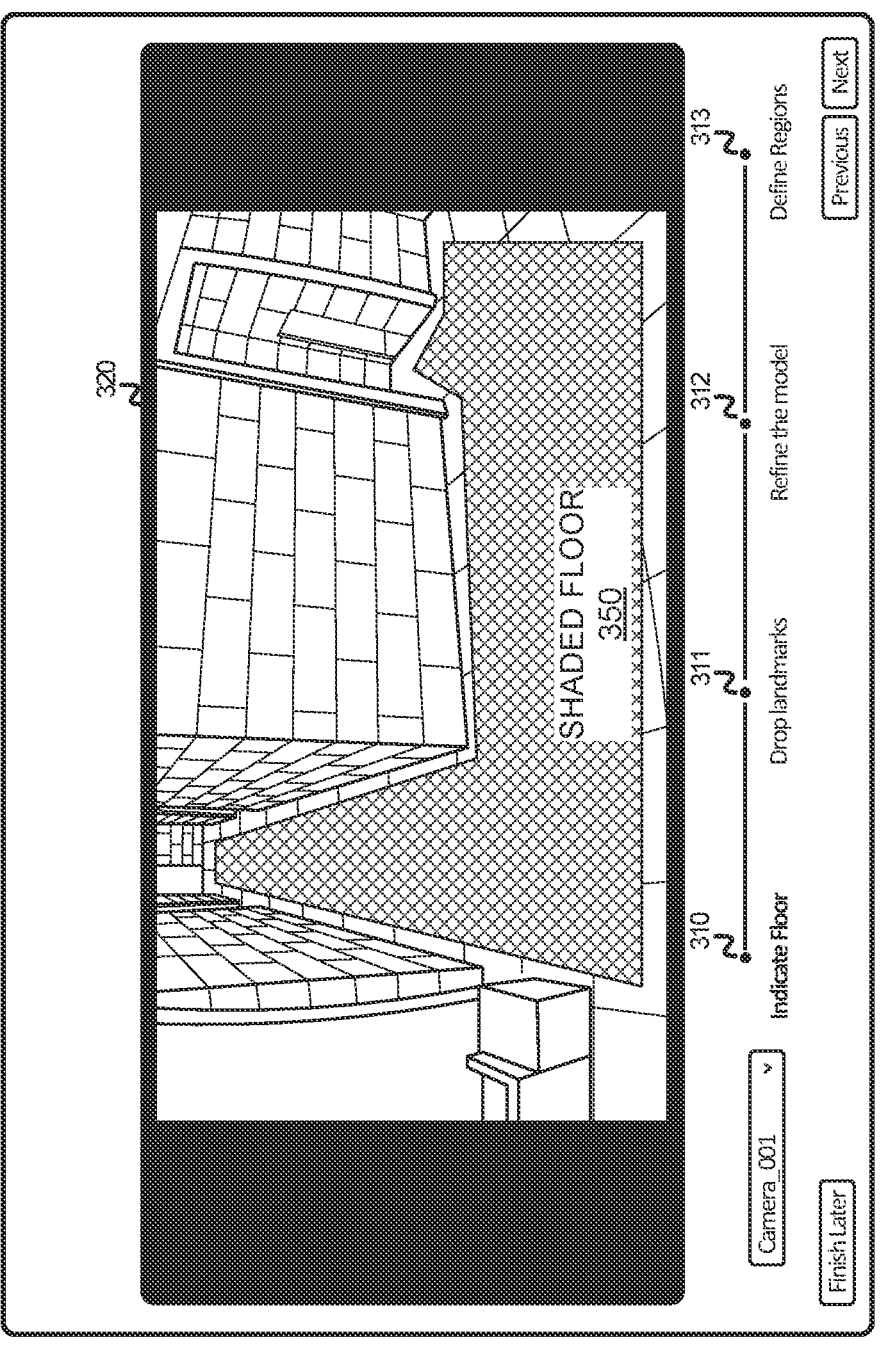
FIG. 3 illustrates a user interface to provide input regarding available traffic areas in a physical area according to an implementation.

FIG. 3 illustrates a user interface 300 to provide input regarding available traffic areas in a physical area according to an implementation. User interface 300 includes video stream 320, shaded floor 350, and workflow operations to indicate the floor 310, drop landmarks 311, refine the model 312, and define regions 313.

Here, user interface 300 is representative of a user interface that is provided at a user device for an administrator of a physical area (e.g., retail store). The user device can comprise a desktop computer, tablet, or some other computing device with a visual display to provide user interface 300. In some examples, the user device is communicatively coupled to a video processing computing device, such as video processing computing device 110 of FIG. 1. Alternatively, the user device can comprise the video processing computing device itself. The administrator can provide feedback using a mouse, touchscreen, or some other interface element.

When a request is generated to define portions of a physical area available to different objects (e.g., people, vehicles, and the like), user interface 300 permits the administrator to indicate available paths or movement areas for the object as part of workflow operation indicate the floor 310. The administrator provides feedback using shading, highlighting, selecting, or some other mechanism to indicate an available movement areas as shaded floor 350 in video stream 320. Shaded floor 350 assists the video processing computing device in identifying potential movement areas of objects in the physical area observed in the video stream.

Figure 4:
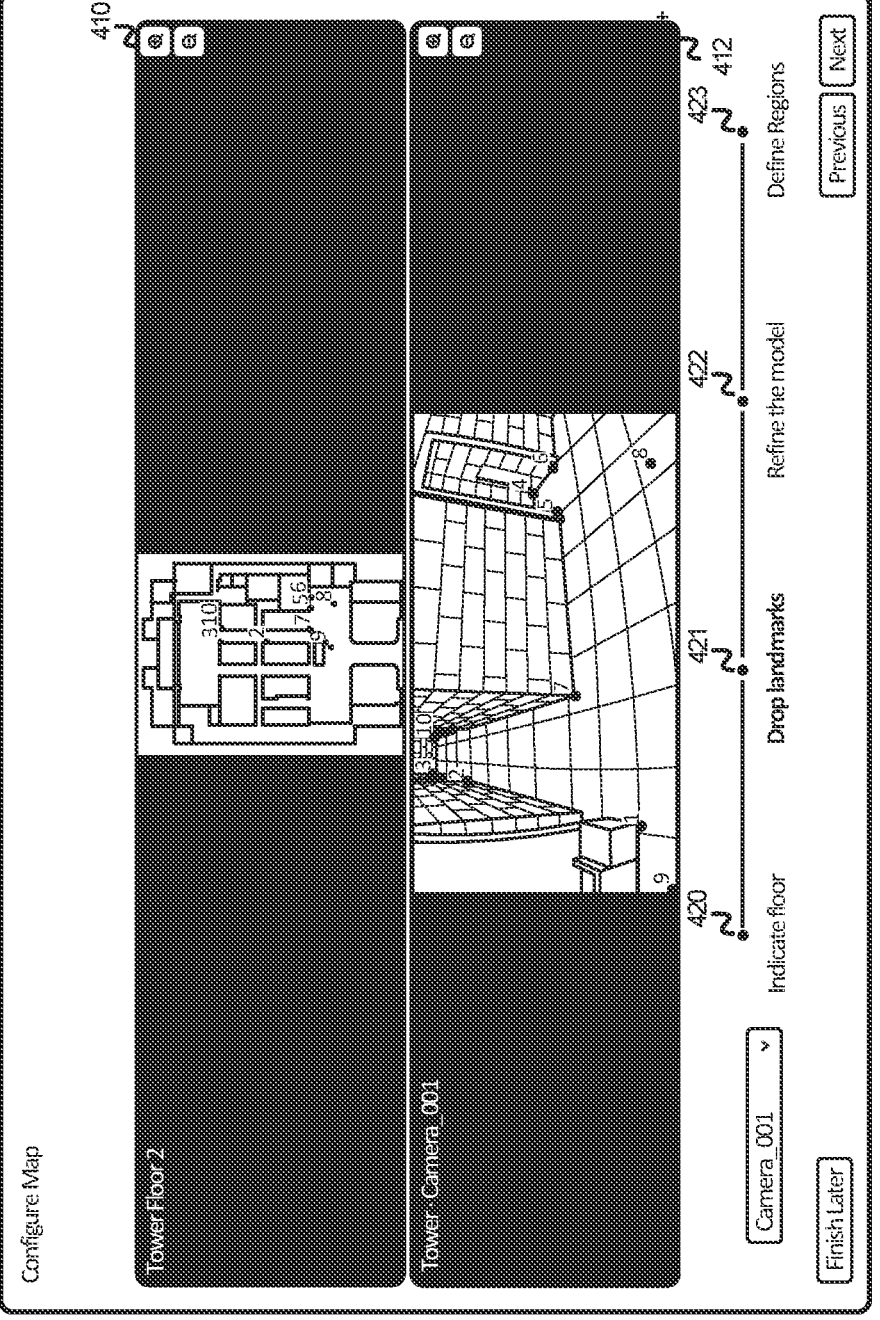
FIG. 4 illustrates a user interface to provide input regarding landmarks in a physical area according to an implementation.

FIG. 4 illustrates a user interface 400 to provide input regarding landmarks in a physical area according to an implementation. User interface 400 includes map 410, video stream 412, and workflow operations to indicate floor 420, drop landmarks 421, refine the model 422, and define regions 423. User interface 400 is representative of a user interface that is provided after user interface 300 of FIG. 3, although an administrator may select the landmarks prior to indicating the available movement areas in some examples.

Here, user interface 400 permits an administrator to select landmarks in a physical area that are used to provide additional information about the orientation and location of a camera in a physical area. In selecting landmarks (or stationary physical objects), the administrator selects, via a mouse, touchscreen, or some other interface element, a representation of a stationary object in map 410. Additionally, the administrator selects or tags the same stationary object in video stream 412. For example, the administrator selects a corner of a shelf in a retail environment and representation of the corner in the map of the environment. The process is repeated as desired by the administrator or until a threshold quantity of landmarks are tagged in map 410 and video stream 412. From the information, the video processing computing device determines the orientation and location of the camera to monitor the movement of objects (e.g., people and vehicles) relative to the map. Advantageously, the administrator can define regions of interest in the map to determine when objects enter and/or leave a particular region.

Although demonstrated as selecting landmarks in a single video stream, similar operations are performed for other video streams for the physical area. The information from the video streams is combined to monitor the movement of objects within a physical area and determine when an object exceeds a region available to the object.

Figure 5:
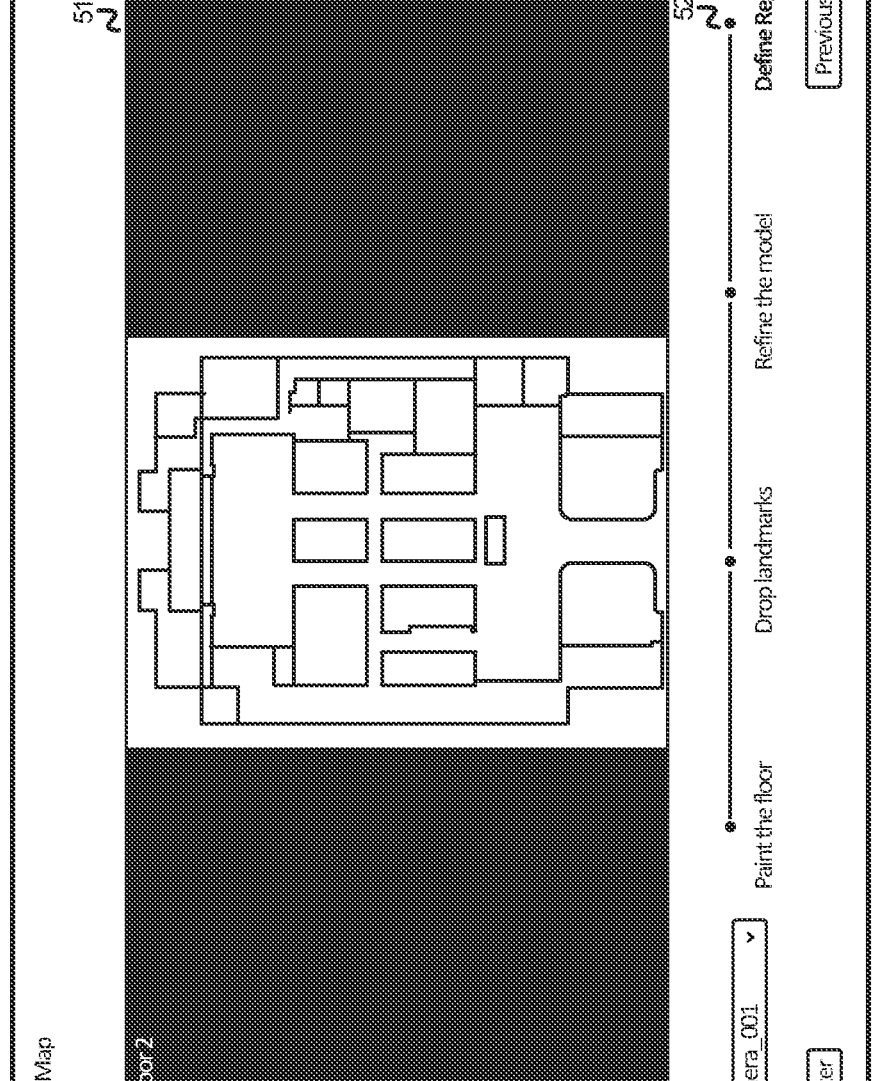
FIG. 5 illustrates a user interface to select the portion of the physical area available to an object according to an implementation.

FIG. 5 illustrates a user interface 500 to select the portion of the physical area available to an object according to an implementation. User interface 500 includes map 510 and workflow portion define regions 523 for a physical area. User interface 500 is representative of a user interface that is provided to an administrator following the identification of landmarks and available movement areas in a physical environment.

In user interface 500, an administrator uses shading, outlining, or highlighting to indicate available locations for objects entering the physical area. For example, a delivery driver will provide credentials that request entry to a physical area. Based on the credentials, a video processing computing device selects an available region or portion of the physical area for the delivery driver and monitors the delivery driver to ensure the driver does not leave the designated region. In at least one implementation, the administrator shades or selects portions available for the movement from the map 510, which can be translated to the video streams for the physical area. In other implementations, the administrator shades or selects the available areas in the one or more video streams for the physical area and uses the different selections to determine when an object has left a selected region.

Once a region is created for an object, the video processing computing device waits for a request from the object to enter the physical area. In response to a request, the video processing computing device, monitors the movement of the object and determines when the object exceeds the permitted region of the physical area. Once the region is exceeded, the video processing computing device generates an alert that is provided to the administrator or a security service to take further action. In some implementations, the notification provides a sample of the video stream that indicates the objected exceeding the region, an identifier for the object, or some other information in association with the object and the event.

Figure 6:
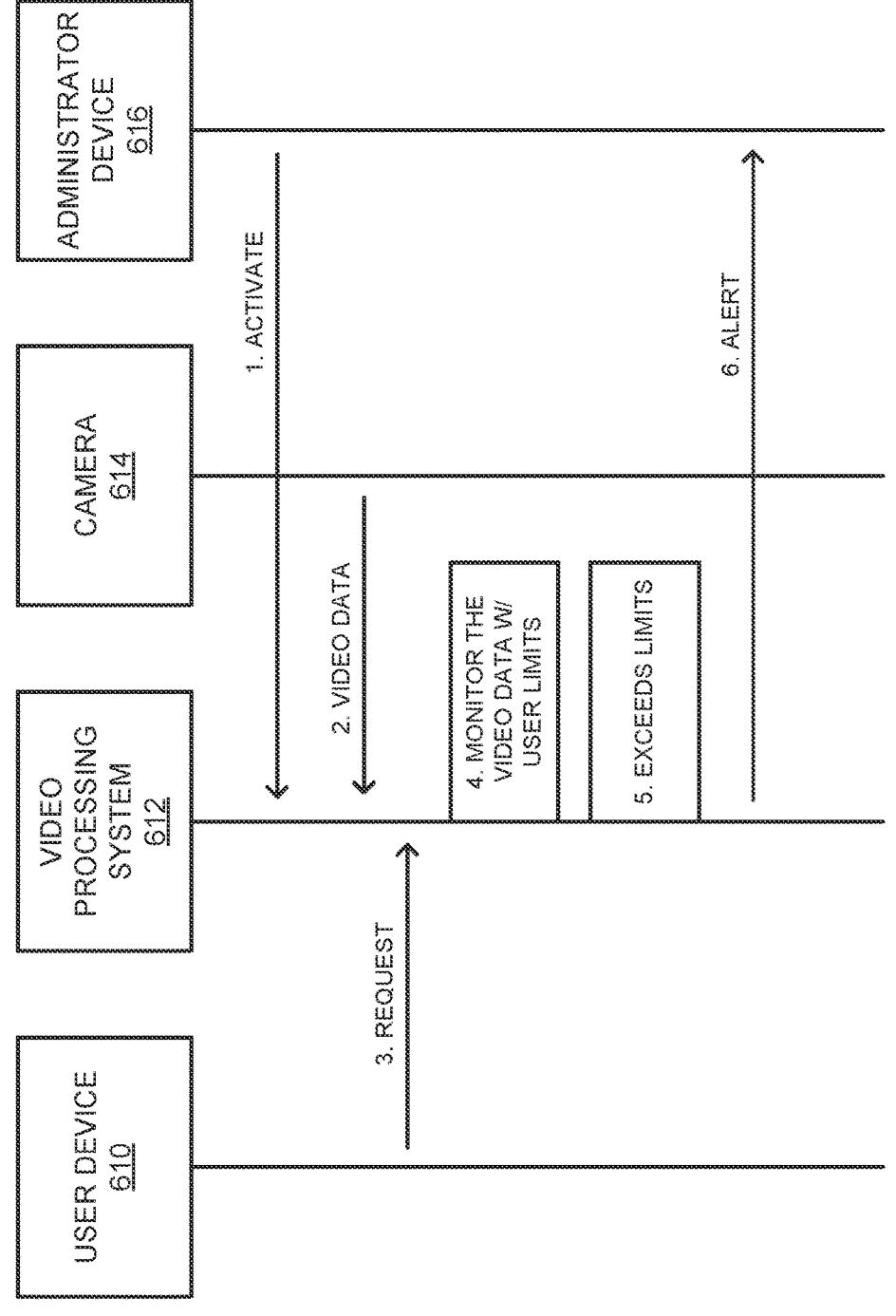
FIG. 6 illustrates a timing diagram of generating an alert associated with improper movement in a physical area according to an implementation.

FIG. 6 illustrates a timing diagram 600 of generating an alert associated with improper movement in a physical area according to an implementation. Timing diagram 600 includes user device 610, video processing system 612, camera 614, and administrator device 616. Although demonstrated as separate in timing diagram 600, administrator device 616 can be implemented at least partially as part of video processing system 612. Video processing system 612 is an example of video processing computing device 110 from FIG. 1.

In timing diagram 600, administrator device 616 activates a security policy for a physical area at step 1. For example, an administrator or manager of a retail environment will set an alarm to identify the movement of objects within the retail environment. After setting the alarm in association with video processing system 612, video processing system 612 starts receiving video data from camera 614 at step 2. Video processing system 612 uses the video data to identify motion in the physical environment, identify lighting changes in the environment, or provide some other video processing in association with the environment. While receiving the video data, user device 610 generates a request to enter a portion or region of the physical area monitored by video processing system 612 at step 3. The request can include user identifier information, passcode information, or some other information associated with the user of user device 610. For example, a delivery driver can use a QR code, bar code, or some other mechanism to initiate the request to enter the physical area and provide credentials to support the request. Video processing system 612 determines whether the user is permitted to enter the environment and, if permitted, identifies a portion or region of the physical area available to the user. If not permitted, video processing system 612 prevents the user from accessing the physical area. In preventing the access to the user, video processing system 612 can prevent a door from being available (i.e., keep the door locked), can maintain motion monitoring for the entire physical area, or can provide some other action to prevent access in association with the user.

When the user is permitted to access a region or portion of the physical area, video processing system 612 identifies the region available to the user and monitors the video data with the user limits for the region at step 4. The user limits include not exceeding the region allocated to the user, limiting the number of users or people within the region, or some other user limits. When the user exceeds the limits at step 5, video processing system 612 generates an alert that is provided to administrator device 616. The alert includes a segment of the video data associated with the exceeded limit, user identifier information, or some other information associated with the exceeded limit. The administrator uses the information to provide a response, such as calling the authorities, dismissing the alert, or provide some other action. In some implementations, the limit is triggered with the user exceeds the available region for a threshold period (e.g., five seconds), however, the user limits are configurable by the administrator of the physical area.

Although demonstrated with a single camera in the example of timing diagram 600, a physical environment can include any number of cameras to provide the desired surveillance operations. Further, while demonstrated in the previous example as monitoring people in a physical area, video processing system 612 can provide similar operations using vehicles, robots, or other types of movable objects.

Figure 7:
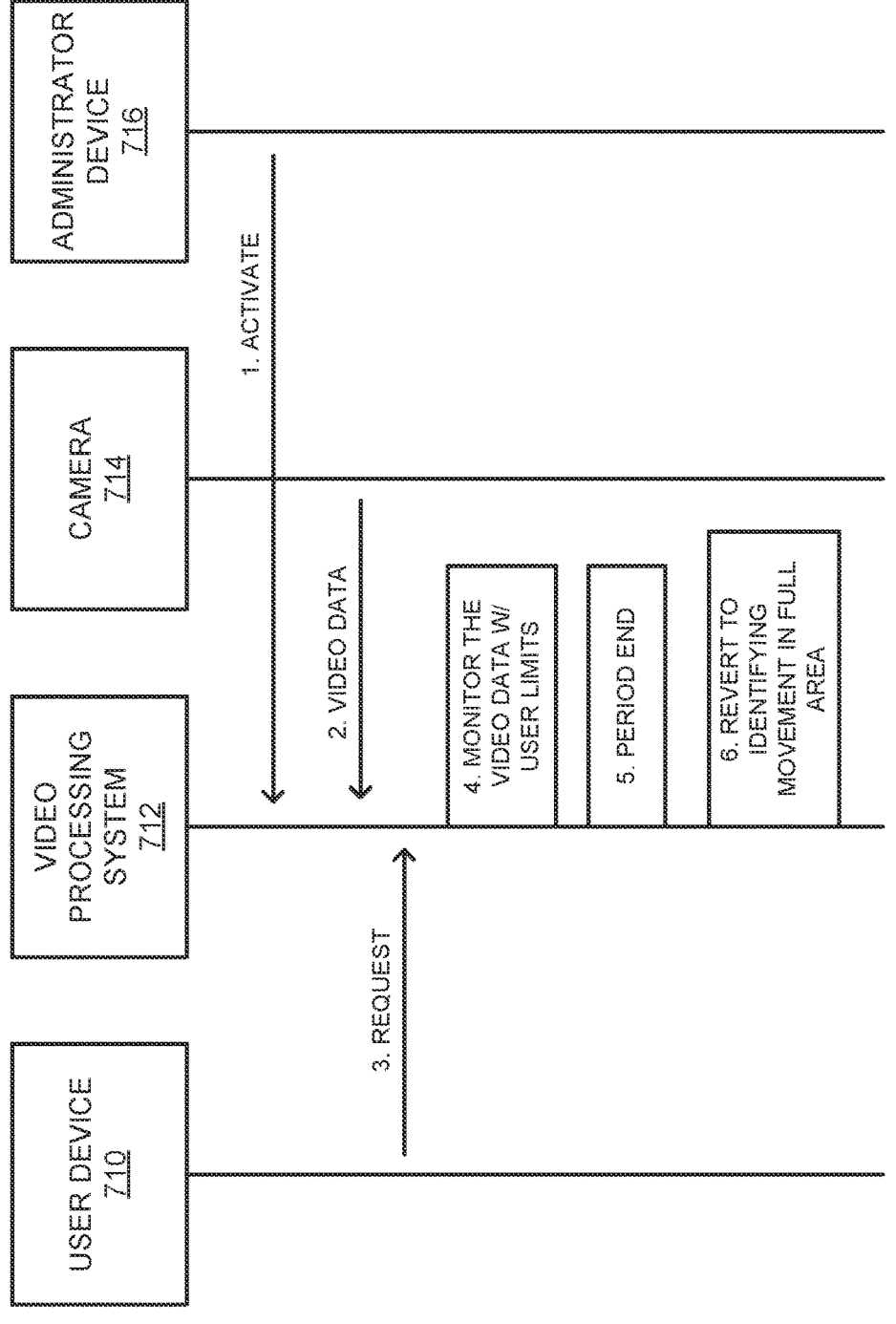
FIG. 7 illustrates a timing diagram of making a portion of a physical area available to an object for a defined period according to an implementation.

FIG. 7 illustrates a timing diagram 700 of making a portion of a physical area available to an object for a defined period according to an implementation. Timing diagram 700 includes user device 710, video processing system 712, camera 714, and administrator device 716. Although demonstrated as separate in timing diagram 700, administrator device 716 can be implemented at least partially as part of video processing system 712. Video processing system 712 is an example of video processing computing device 110 from FIG. 1.

In timing diagram 700, administrator device 716 activates a security policy for a physical area at step 1. For example, an administrator or manager of a retail environment will set an alarm to identify the movement of objects within the retail environment. After setting the alarm in association with video processing system 712, video processing system 712 starts receiving video data from camera 714 at step 2. Video processing system 712 uses the video data to identify motion in the physical environment, identify lighting changes in the environment, or provide some other video processing in association with the environment. While receiving the video data, user device 710 generates a request to enter a portion or region of the physical area monitored by video processing system 712 at step 3. The request can include user identifier information, passcode information, or some other information associated with the user of user device 710. For example, a delivery driver can use a QR code, bar code, or some other mechanism to initiate the request to enter the physical area and provide credentials to support the request. The window of the entry can include a QR code in some examples that identifies the physical area, and the delivery driver enters credentials after scanning the QR code using a user device (e.g., smartphone). Video processing system 712 determines whether the user is permitted to enter the environment and, if permitted, identifies a portion or region of the physical area available to the user. If not permitted, video processing system 712 prevents the user from accessing the physical area. In preventing the access to the user, video processing system 712 can prevent a door from being available (i.e., keep the door locked), can maintain motion monitoring for the entire physical area, or can provide some other action to prevent access in association with the user.

When the user is permitted to access a region or portion of the physical area, video processing system 712 identifies the region available to the user and monitors the video data with the user limits for the region at step 4. For example, for a delivery driver, the driver will be permitted a region close to the entrance door to drop off and pick up packages in association with a retail environment. While monitoring the video data with the user limits, video processing system 712 identifies a period end associated with the access of the user at step 5. The period can end based on a timer (e.g., five minutes), can end based on the user indicating the access is no longer required, or based on some other factor. When the period of access ends, video processing system 712 reverts to identifying movement in the full physical area. Returning to the retail environment example, administrator device 716 activates a security system to monitor for any movement within the physical environment. Once a request is generated by user device 710, a portion of the physical area is made available to the user to provide a desired action (e.g., drop off or pickup products). Once the user provides the service, video processing system 712 reverts to monitoring and alerting based on movement in the entire physical area.

Although demonstrated with a single camera in the example of timing diagram 700, a physical environment can include any number of cameras to provide the desired surveillance operations. Further, while demonstrated in the previous example as monitoring people in a physical area, video processing system 712 can provide similar operations using vehicles, robots, or other types of movable objects.

Figure 8:
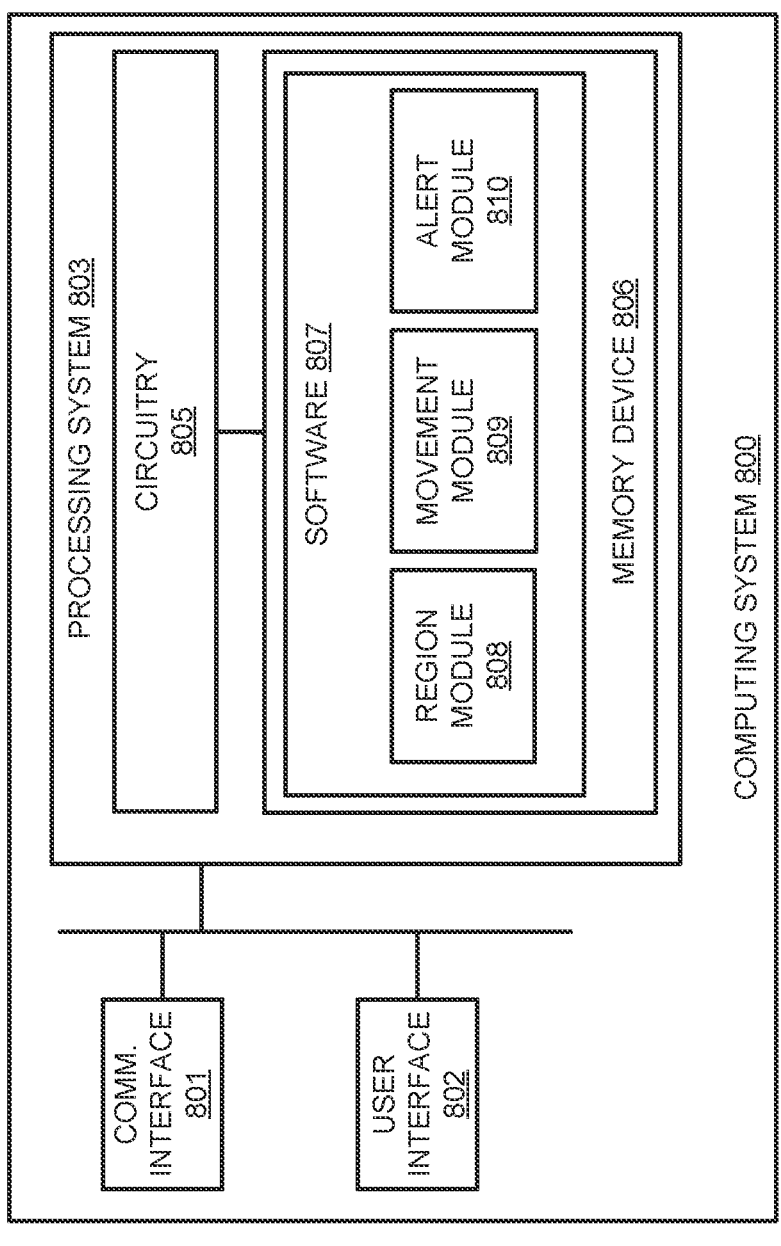
FIG. 8 illustrates a computing system to provide tiered motion detection for video surveillance according to an implementation.

FIG. 8 illustrates a computing system to provide tiered motion detection for video surveillance according to an implementation. Computing system 800 is representative of any computing system or systems with which the various operational architectures, processes, scenarios, and sequences disclosed herein for a video processing computing device, such as video processing computing device 110 of FIG. 1. Computing system 800 comprises communication interface 801, user interface 802, and processing system 803. Processing system 803 is linked to communication interface 801 and user interface 802. Processing system 803 includes processing circuitry 805 and memory device 806 that stores operating software 807. Computing system 800 may include other well-known components such as a battery and enclosure that are not shown for clarity.

Communication interface 801 comprises components that communicate over communication links, such as network cards, ports, radio frequency (RF), processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format-including combinations thereof. In some implementations, communication interface 801 may be configured to communicate with one or more video sources including security or surveillance cameras. Communication interface 801 can further be configured to communicate with computing devices that provide storage for the video data associated with the video sources. The computing devices may comprise server computers, desktop computers, or other computing systems available via a local network connection or the internet. Communication interface 801 may also communicate with client computing devices, such as laptop computers or smartphones. The client computing devices can belong to administrators that configure and manage the surveillance system and user devices that request access to the physical area.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus-including combinations thereof. In some implementations, user interface 802 may display video streams and maps for feedback by a user. The feedback can be used to indicate landmarks in the video streams and maps, define regions for different users, or provide some other user feedback.

Processing circuitry 805 comprises microprocessor (at least one processor) and other circuitry that retrieves and executes operating software 807 from memory device 806. Memory device 806 may include volatile and nonvolatile, removable and non-removable media implemented in any method or technology for storage of information, such as computer readable instructions, data structures, program modules, or other data. Memory device 806 may be implemented as a single storage device but may also be implemented across multiple storage devices or sub-systems. Memory device 806 may comprise additional elements, such as a controller to read operating software 807. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 805 is typically mounted on a circuit board that may also hold memory device 806 and portions of communication interface 801 and user interface 802. Operating software 807 comprises computer programs, firmware, or some other form of machine-readable program instructions. Operating software 807 includes region module 808, movement module 809, and alert module 810, although any number of software modules may provide the same operation. Operating software 807 may further include an operating system, utilities, drivers, network interfaces, applications, or some other type of software. When executed by processing circuitry 805, operating software 807 directs processing system 803 to operate computing system 800 as described herein.

In one implementation, region module 808 directs processing system 803 to identify a request for an object to enter a physical area and select a portion of the physical area available to the object based on the request. For example, in a retail environment a delivery person will generate a request with credentials to enter a physical area and computing system 800 will determine the portion of the physical area for the delivery person based on the request (i.e., the identity of the delivery person). Once the portion of the physical area is selected, movement module 809 directs processing system 803 to monitor movement of the object in the physical area using one or more video streams from one or more cameras and determine whether the object moved outside the portion of the physical area available to the object based on the monitored movement.

Returning to the example of the delivery person to a retail environment, computing system 800 can permit the delivery person to move within fifteen feet of the entry point of the retail environment. If the delivery person does not exceed the distance in the physical area, then no alert will be generated. In contrast, if the delivery person does exceed the distance, alert module 810 directs processing system 803 to generate an alert that is communicated to an administrator of the physical area, a security service, authorities, or some other management entity for the physical area.

In some implementations, in defining the portions that are available to the different objects, region module 808 directs processing system 803 to obtain user input in the one or more video streams that defines the portion of the physical area available to the object. The user input can comprise shading, highlighting, or some other input that defines the portions available in each of the video streams. If the user exceeds the limits set forth from the user input, (i.e., movement outside of the shading), alert module 810 generates an alert.

In another implementation, in defining the portions that are available to different objects, region module 808 directs processing system 803 to identify an overhead map of the physical area, such as a map of the retail environment. Region module 808 further directs processing system 803 to obtain user input identifying stationary objects in the one or more video streams and the map, wherein the user input for each stationary object of the stationary objects correlates a tag of said stationary object in at least one video stream of the one or more video streams to a representation of said object stationary object in the map. For example, an administrator will indicate the location of an aisle corner in both the map and the video stream. The stationary objects are used by computing system 800 to identify the location and orientation of the cameras relative to the physical environment. Additionally, the stationary objects or landmarks provide computing system 800 with the ability to better monitor the movement of the objects relative to the map of the physical area by determining the location of the moving object relative to the known stationary objects.

In some examples, the user provides additional input indicating the available portion to the movable objects relative to the stationary objects. The additional input is provided in the video streams or the map as shading, highlighting, or some other input to indicate the available portion relative to the stationary objects. In at least one implementation, computing system 800 obtains user input that defines available traffic areas in the physical area (e.g., footpath areas, vehicle traffic areas, etc.) in the video streams and/or the map of the physical area. Once the available traffic areas are provided for the physical area, the user indicates a subset of the available traffic areas for the portion available to the requesting object. For example, in a retail environment, first input is provided that indicates all of the available paths in the aisles and other traffic areas of the The included descriptions and figures depict specific implementations to teach those skilled in the art how to make and use the best option. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
identifying a map of a physical area;
obtaining user input identifying stationary objects in one or more video streams from one or more cameras and the map, wherein the user input for each stationary object of the stationary objects correlates a tag of said stationary object in at least one video stream of the one or more video streams to a representation of said stationary object in the map;
identifying a request for an object to enter the physical area;
obtaining second user input that defines a portion of the physical area available to the object relative to the stationary objects;
selecting the portion of the physical area available to the object based on the request;
monitoring movement of the object in the physical area using the one or more video streams;
determining that the object moved outside the portion of the physical area available to the object based on the monitored movement; and
generating an alert in response to the determination that the object moved outside the portion of the physical area available to the object.

2. The method of claim 1 further comprising:
obtaining user input in the one or more video streams that defines the portion of the physical area available to the object.

3. The method of claim 1, wherein determining that the object moved outside of the portion of the physical area available to the object comprises:

determining the object exceeds the portion of the physical area available to the object for a user-configurable time threshold.

4. The method of claim 1, wherein obtaining the second user input that defines the portion of the physical area available to the object relative to the stationary objects comprises obtaining user shading or highlighting of the portion of the physical area in the map or on at least one video stream of the one or more video streams.

5. The method of claim 1, wherein obtaining the second user input that defines the portion of the physical area available to the object relative to the stationary objects:

obtaining third user input that defines available traffic areas in the physical area; and wherein obtaining user shading or highlighting of the portion of the physical area in the map or on at least one video stream of the one or more video streams comprises receiving a selection of a subset of the available traffic areas as the portion of the physical area.

6. The method of claim 1, wherein the physical area comprises a retail environment.

7. The method of claim 1, wherein the object comprises a person, and wherein identifying the request for the object to enter the physical area comprises receiving a passcode from the person to enter the physical area.

8. The method of claim 1 further comprising:

identifying a second request for a second object to enter the physical area;

selecting the portion of the physical area available to the second object based on the second request;

monitoring the movement of the object in the physical area using the one or more video streams;

identifying an expiration event to prohibit the second object in the portion of the physical area; and in response to the expiration event, generating a second alert when movement is detected in the portion of the physical area.

9. A computing apparatus comprising:

a storage system comprising non-transitory computer readable storage media;

a processing system comprising at least one processor and operatively coupled to the storage system; and program instructions stored on the storage system that, when executed by the processing system, direct the computing apparatus to:

identify a map of a physical area;

obtain user input identifying stationary objects in one or more video streams from one or more cameras and the map, wherein the user input for each stationary object of the stationary objects correlates a tag of said stationary object in at least one video stream of the one or more video streams to a representation of said stationary object in the map;

identify a request for an object to enter a physical area;

obtain second user input that defines a portion of the physical area available to the object relative to the stationary objects;

select the portion of the physical area available to the object based on the request;

monitor movement of the object in the physical area using the one or more video streams;

determine that the object moved outside the portion of the physical area available to the object based on the monitored movement; and generate an alert in response to the determination that the object moved outside the portion of the physical area available to the object.

10. The computing apparatus of claim 9, wherein the program instructions further direct the computing apparatus to:

obtain user input in the one or more video streams that defines the portion of the physical area available to the object.

11. The computing apparatus of claim 9, wherein to determine that the object moved outside of the portion of the physical area available to the object, the program instructions direct the computing apparatus to:

determine the object exceeds the portion of the physical area available to the object for a user-configurable time threshold.

12. The computing apparatus of claim 9, wherein obtaining the second user input that defines the portion of the physical area available to the object relative to the stationary objects comprises obtaining user shading or highlighting of the portion of the physical area in the map or on at least one video stream of the one or more video streams.

13. The computing apparatus of claim 9, wherein obtaining the second user input that defines the portion of the physical area available to the object relative to the stationary objects:

obtaining third user input that defines available traffic areas in the physical area; and wherein obtaining user shading or highlighting of the portion of the physical area in the map or on at least one video stream of the one or more video streams comprises receiving a selection of a subset of the available traffic areas as the portion of the physical area.

14. The computing apparatus of claim 9, wherein the physical area comprises a retail environment.

15. The computing apparatus of claim 9, wherein the object comprises a person, and wherein identifying the request for the object to enter the physical area comprises receiving a passcode from the person to enter the physical area.

16. The computing apparatus of claim 9, wherein the program instructions further direct the computing apparatus to:

identify a second request for a second object to enter the physical area;

select the portion of the physical area available to the second object based on the request;

monitor the movement of the object in the physical area using one or more video streams from one or more cameras;

identify an expiration event to prohibit the second object in the portion of the physical area; and in response to the expiration event, generate a second alert when movement is detected in the portion of the physical area.

17. An apparatus comprising:

one or more non-transitory computer readable storage media; and program instructions stored on the one or more non-transitory computer readable storage media that, when executed by at least one processor, direct the at least one processor to:

identify a map of a physical area;

obtain user input identifying stationary objects in one or more video streams from one or more cameras and the map, wherein the user input for each stationary object of the stationary objects correlates a tag of said stationary object in at least one video stream of the one or more video streams to a representation of said stationary object in the map;

identify a request for an object to enter a physical area;

obtain second user input that defines a portion of the physical area available to the object relative to the stationary objects;

select the portion of the physical area available to the object based on the request;

monitor movement of the object in the physical area using the one or more video streams;

determine that the object moved outside the portion of the physical area available to the object based on the monitored movement; and generate an alert in response to the determination that the object moved outside the portion of the physical area available to the object.

18. The apparatus of claim 17, wherein the program instructions further direct the at least one processor to:

obtain user input in the one or more video streams that defines the portion of the physical area available to the object.

19. The apparatus of claim 17, wherein to determine that the object moved outside of the portion of the physical area available to the object, the program instructions direct the at least one processor to:

determine the object exceeds the portion of the physical area available to the object for a user-configurable time threshold.

20. The apparatus of claim 17, wherein obtaining the second user input that defines the portion of the physical area available to the object relative to the stationary objects comprises obtaining user shading or highlighting of the portion of the physical area in the map or on at least one video stream of the one or more video streams.

\* \* \* \* \*